US012701122B1

(12) United States Patent
Collard et al.

(10) Patent No.: US 12,701,122 B1
(45) Date of Patent: Aug. 4, 2026

(54) MANAGING NETWORK MITIGATION TECHNIQUES

(71) Applicant: Amazon Technologies, Inc., Seattle, WA (US)

(72) Inventors: Patrick Collard, Seattle, WA (US); Stephen Goodman, Seattle, WA (US); John Paul Schweitzer, Seattle, WA (US); Luke Kenneth Schubert, Seattle, WA (US); William Kupersanin, Seattle, WA (US); Jacob Nguyen, Seattle, WA (US); Elisabeth Margaret Nagy, Seattle, WA (US); Wayne Alan Fullen, Seattle, WA (US); Michael Lowney, Seattle, WA (US); Jared Sylvester, Seattle, WA (US); Thomas Bradley Scholl, Seattle, WA (US); Kushal Mall, Seattle, WA (US); Darshan Narayana Reddy, Seattle, WA (US); Bradford Sachin Chatterjee, Seattle, WA (US); Gregory Stephen Molchany, Seattle, WA (US); Ravi Karnam, Seattle, WA (US); Edward Brindley, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 366 days.

(21) Appl. No.: 17/643,797

(22) Filed: Dec. 10, 2021

(51) Int. Cl.
| | |
|---|---|
| *H04L 9/40* | (2022.01) |
| *H04L 41/142* | (2022.01) |
| *H04L 43/16* | (2022.01) |
| *H04L 67/51* | (2022.01) |

(52) U.S. Cl.
CPC .......... *H04L 63/108* (2013.01); *H04L 41/142* (2013.01); *H04L 43/16* (2013.01); *H04L 63/0876* (2013.01); *H04L 63/1416* (2013.01); *H04L 63/1458* (2013.01); *H04L 67/51* (2022.05)

(58) Field of Classification Search
CPC ..... H04L 63/108; H04L 67/51; H04L 41/142; H04L 43/16; H04L 63/0876; H04L 63/1416; H04L 63/1458
See application file for complete search history.

(56) References Cited

U.S. PATENT DOCUMENTS

| | | | | |
|---|---|---|---|---|
| 7,380,123 B1 * | 5/2008 | Hernacki | ................ | G06F 21/31 |
| | | | | 713/168 |
| 9,762,610 B1 * | 9/2017 | Kwan | ..................... | H04L 63/20 |
| 9,774,619 B1 * | 9/2017 | Radlein | ............... | H04L 63/1458 |

(Continued)

*Primary Examiner* — Daniel B Potratz
*Assistant Examiner* — Matthias Habtegeorgis
(74) *Attorney, Agent, or Firm* — Knobbe, Martens, Olson & Bear, LLP

(57) ABSTRACT

The present disclosure generally relates to systems and methods for the monitoring and characterization of network access activities as indicative of enumeration of network resources. A monitoring and mitigation service can monitor attributes of network resource access to characterize or identify the likelihood of enumeration activities. The characterization can be expressed as a confidence value based on historical access information. For characterizations that exceed a threshold, the monitoring and mitigation service can then identify network mitigation techniques to mitigate the impact or potential for enumeration.

22 Claims, 7 Drawing Sheets

(56)                    References Cited

U.S. PATENT DOCUMENTS

| | | | | |
|---|---|---|---|---|
| 10,341,355 | B1 * | 7/2019 | Niemoller | H04L 63/104 |
| 2010/0122333 | A1 * | 5/2010 | Noe | H04L 63/0815 |
| | | | | 726/8 |
| 2012/0331527 | A1 * | 12/2012 | Walters | G06F 21/6218 |
| | | | | 726/4 |
| 2014/0304320 | A1 * | 10/2014 | Taneja | H04L 69/326 |
| | | | | 709/203 |
| 2017/0054750 | A1 * | 2/2017 | Ward | G06F 16/904 |
| 2017/0142769 | A1 * | 5/2017 | Gilbert | H04W 76/15 |
| 2017/0374098 | A1 * | 12/2017 | Kish | H04L 43/0876 |
| 2018/0068301 | A1 * | 3/2018 | Abdulrahiman | G06Q 20/3572 |
| 2018/0365899 | A1 * | 12/2018 | Wolf | G06Q 30/016 |
| 2019/0297096 | A1 * | 9/2019 | Ahmed | H04L 63/1441 |
| 2020/0007548 | A1 * | 1/2020 | Sanghavi | H04L 45/748 |
| 2020/0358780 | A1 * | 11/2020 | Anbalagan | H04L 63/102 |
| 2021/0004451 | A1 * | 1/2021 | Novik | H04W 12/06 |
| 2021/0073378 | A1 * | 3/2021 | Stamper | H04L 63/12 |
| 2021/0111979 | A1 * | 4/2021 | Reid | H04L 9/0819 |
| 2022/0279364 | A1 * | 9/2022 | Koral | H04W 24/02 |
| 2024/0086539 | A1 * | 3/2024 | Ball, Sr. | G06F 21/552 |

* cited by examiner

MANAGING NETWORK MITIGATION TECHNIQUES

BACKGROUND

Generally described, computing devices and communication networks can be utilized to exchange data and/or information. In a common application, a computing device can request content from another computing device via the communication network. For example, a user having access to a computing device can utilize a software application to request content or access network-hosed applications/functionality from a computing device via the network (e.g., the Internet). In such embodiments, the user's computing device can be referred to as a client computing device and the network-based computing device can be referred to as a service provider. Additionally, the client computing device can collect or generate information and provide the collected information to a network-based computing device for further processing or analysis.

In some embodiments, a network service provider can provide computing device resources, such as virtual machine instances, that are configurable to execute tasks based on network service provider customers. In some scenarios, it may be possible that network-based computing device resources can be compromised such that a computing device, often independent of the customer, can manipulate the network-based resources. In one example, a plurality of compromised network-based resources can be coordinated by a computing device that can be characterized or referred to as a command and control node to disrupt the operation of another computing device, such as a coordinated, distributed denial of service ("DDOS") attack. To achieve such manipulations, a computing device can be configured to initiate communications with various network resources to identify opportunities or vulnerabilities for compromise or manipulation. Such activities can be generally referred to as enumeration.

BRIEF DESCRIPTION OF THE DRAWINGS

Various features will now be described with reference to the following drawings. Throughout the drawings, reference numbers may be re-used to indicate correspondence between referenced elements. The drawings are provided to illustrate examples described herein and are not intended to limit the scope of the disclosure.

DETAILED DESCRIPTION

Figure 1:
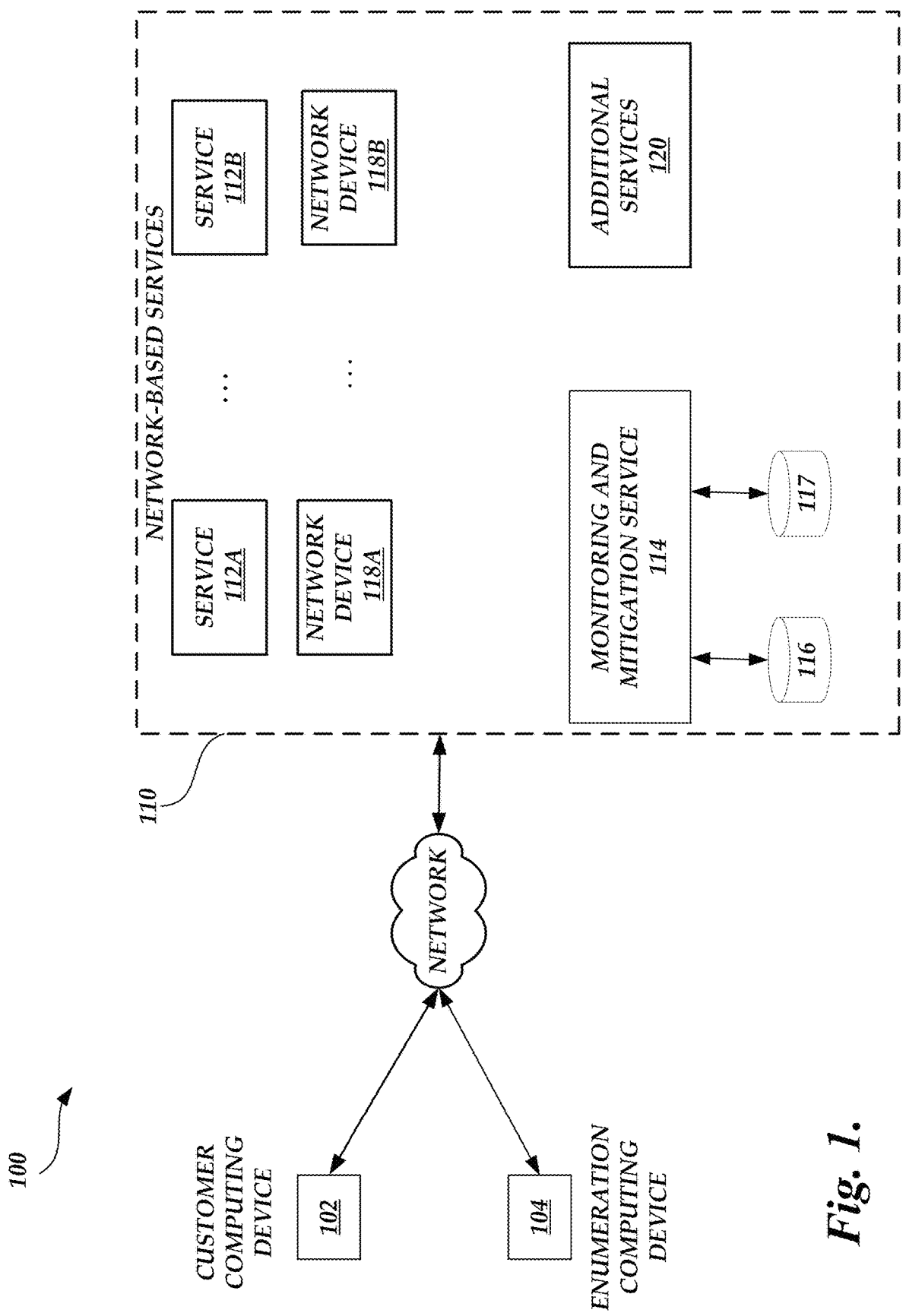
FIG. 1 is a block diagram depicting an illustrative system for implementing a network service for monitoring network based services and implementing responsive actions according to one or more aspects of the present application.

Aspects of the present disclosure relate to systems and methods for monitoring manipulation of network-based computing resources. More specifically, one or more aspects of the present application correspond to monitoring network activities to characterize the likelihood that computing devices may be enumerating network-based resources and implementing various responsive actions. Illustratively, a network service can implement a monitoring and mitigation service. In one aspect, the monitoring and mitigation service can monitor attributes of network resource activity, such as the configuration and execution of communications with network-based resources. Illustratively, the monitoring and mitigation service can process the monitored attributes to characterize or identify the likelihood that network-based resource communications corresponds to enumeration activity. The characterized or identified likelihood that the one or more attributes of network resource communication or utilization of network-based resources is indicative of an enumeration of network-based resources (e.g. the characterized likelihood of enumeration activity).

In other aspects, the monitoring and mitigation service can process the identified or characterized likelihood of enumeration activity to identify one or more responsive actions. Illustratively, the responsive actions can include network mitigation techniques that prevent or limit access to network-based resources. More specifically, the monitoring and mitigation service can identify one or more network mitigation techniques that will cause, delay or disrupt network communications received from the target/identified computing device. The one or more responsive actions can also include network monitoring techniques that attempt to record or captures aspects of the characterized enumeration activity, such as for further examination, evidentiary purposes, etc. Illustratively, the monitoring and mitigation service can propagate network mitigation information or network observation activity, such as the throttling communications, non-responsive communications, suppression of communication, etc., to routing components within the network service provider network. For example, the routing components will then be updated with the network mitigation information to implement the network mitigation technique. Illustratively, the monitoring and mitigation service can illustratively implement various network mitigation techniques, network monitoring techniques or combinations thereof. Additionally, the responsive actions do not necessarily have to be characterized exclusively as requiring a network or network communications.

Individual aspects of the monitoring and mitigation service can be implemented as a stand-alone service that performs the monitoring function and generates inputs to the monitoring and mitigation service. For example, a stand-alone service may be implemented that provides confidence values (or similar outputs) regarding a characterization of the likelihood of enumeration activity. In another example, a stand-alone service may be implemented that provides an indication of a measurement of success of a responsive action, such as a mitigation technique. In this regard, the stand-alone services may be configured to provide identified functionality as part of a monitoring and mitigation service, but may be otherwise configured to be independently executable with additional or alternative functionality. Alternatively, the various inputs/processing of a monitoring and mitigation service can be integrated as part of the monitoring and mitigation service.

Generally, traditional, manipulation of network-based resources by computing devices, such as access network-based resources to cause coordinated DDOS attacks, presents significant technical challenges for network-based service providers. In one aspect, the targets (e.g., computing devices or computing networks) of the coordinated attacks are subject to significant disruption or limitation of operational status, which may be independent of the network service provider. Accordingly, the network service provider resources, can contribute to significant disruption to computing systems and networks, especially in situations of a network service provider that may offer customer multi-regional network resources. In other aspects, the manipulation of computing resources for purposes of generating large scale network attacks, such as DDOS attacks, especially in multi-tenant network resources can present significant inefficiencies for the network service provider, including limiting functionality of network resources, consuming network bandwidth and disrupting operations or functionality provided to other customers of the network service.

To address at least a portion of the above-described deficiencies, one or more aspects of the present application correspond to systems and methods for characterizing the likelihood that the one or more attributes of network resource utilization is indicative of an enumeration of network-based resources. Additionally, one or more aspects of the present application correspond to system and methods for implementing one or more responsive actions in the form of mitigation techniques responsive, observations techniques or a combination thereof. The responsive actions can correspond to such characterizations of enumeration activity. Illustratively, the characterization of the likelihood that the one or more attributes of network resource utilization is indicative of an enumeration of network-based resources can be expressed as a confidence value. The confidence value can be attributed to historical information regarding determined enumeration activity. Accordingly, the responsive action (mitigation or observation) can be based on the identified enumeration activity. Additionally, the monitoring and mitigation service can further receive feedback that corresponds to a measurement or characterization of whether enumerated activity was successfully mitigated, whether there was additional impact to otherwise authorized network access, or a combination thereof.

Although aspect of the present application will be described with regard to illustrative network components, interactions and routines, one skilled in the relevant art will appreciate that one or more aspects of the present application may be implemented in accordance with various environments, system architectures, computing device architectures and the like. Similarly, reference to specific devices, such as target devices can be considered to be general references and not intended to provide additional meaning or configurations for individual computing devices. Still further, reference to any particular responsive action or type of responsive action is intended to be general and should not be interpreted in a limiting manner, including limiting responsive action to network-based actions. Additionally, the examples are intended to be illustrative in nature and should not be construed as limiting.

FIG. 1 depicts a block diagram of an embodiment of the system 100. The system 100 can comprise a network, the network connecting a number of computing devices 102, computing devices 104 and a network service 110. Illustratively, the various aspects associated with the network service 110 can be implemented as one or more components that are associated with one or more functions or services.

The components may correspond to software modules implemented by one or more computing devices, which may be separate stand-alone computing devise. Accordingly, the components of the network service 110 should be considered as a logical representation of the service, not requiring any specific implementation on one or more computing device.

The network 106 depicted in FIG. 1 connects the devices and modules of the system. The network can connect any number of devices. In some embodiments, a network service provider provides network-based services to client devices via a network. A network service provider implements network-based services and refers to a large, shared pool of network-accessible computing resources (such as compute, storage, or networking resources, applications, or services), which may be virtualized or bare-metal. The network service provider can provide on-demand network access to a shared pool of configurable computing resources that can be programmatically provisioned and released in response to customer commands. These resources can be dynamically provisioned and reconfigured to adjust to variable load. The concept of "cloud computing" or "network-based computing" can thus be considered as both the applications delivered as services over the network and the hardware and software in the network service provider that provide those services. In some embodiments, the network may be a content delivery network.

The computing devices 102 and computing devices 104 in FIG. 1 can connect to the network and the network service 110. Solely for purposes of illustration, computing devices 102 represent one or more targets of a coordinated attack, such as a DDOS attack generated by computing resources maintained by the network service 110. Computing devices 104 represent one or more computing devices that can be identified or characterized as computing devices attempting enumeration activities that may eventually provide configurations or commands to cause the use, manipulation or compromise of the computing resources maintained by the network service 110 as part of a coordinated attack. Accordingly, computing devices 102, 104 are illustrated separately in the present application for purposes of the functionality or role in a coordinated attack. Computing device 102 may be considered a "target" or "victim" in the attack. The computing device 102 may also be representative of a computing network associated with a plurality of computing devices. Additionally, computing device 102 may not be a customer or otherwise associated with the network service 110. Computing device 104 may be considered a enumeration computing device that is the "instigator" or "coordinator" of the enumeration activity for mitigation.

The computing devices 102, 104 can be configured to transmit a request to the network service 110 to illustratively access one or more network-based services using a communication protocol. The computing devices 102, 104 are configured to have at least one processor. That processor can be in communication with memory for maintaining computer-executable instructions. The computing devices 102, 104 may be physical or virtual. The computing devices may be mobile devices, personal computers, servers, or other types of devices. The computing devices 102, 104 may have a display and input devices through which a user can interact with the user-interface component. The configuration or implementation of computing devices 102 and computing devices 104 do not have to be identical.

Illustratively, the network service 110 can include a plurality of network-based services that can provide functionality responsive to configurations/requests transmitted by the client computing devices 102, such as in the implementation of a set of microservices that are configured to provide underlying functionality to applications hosted by a service provider. As illustrated in FIG. 1, the network-based services include as set of network-based services 112A, 112B, etc. Illustratively, each network-based service can be configured with defined functionality based on configuration information or executable commands. As described herein, the network-based services 112A, 112B can be illustratively configured, manipulated or compromised in a manner by a command and control node to elicit or contributed to a coordinated attack, such as a DDOS attack. To achieve such compromise or manipulation, the network service can be enumerated to identify vulnerabilities. Additionally, in some embodiments, network-based services 112A, 112B represent different logical or geographic regions provided by the network service 110.

Figure 2:
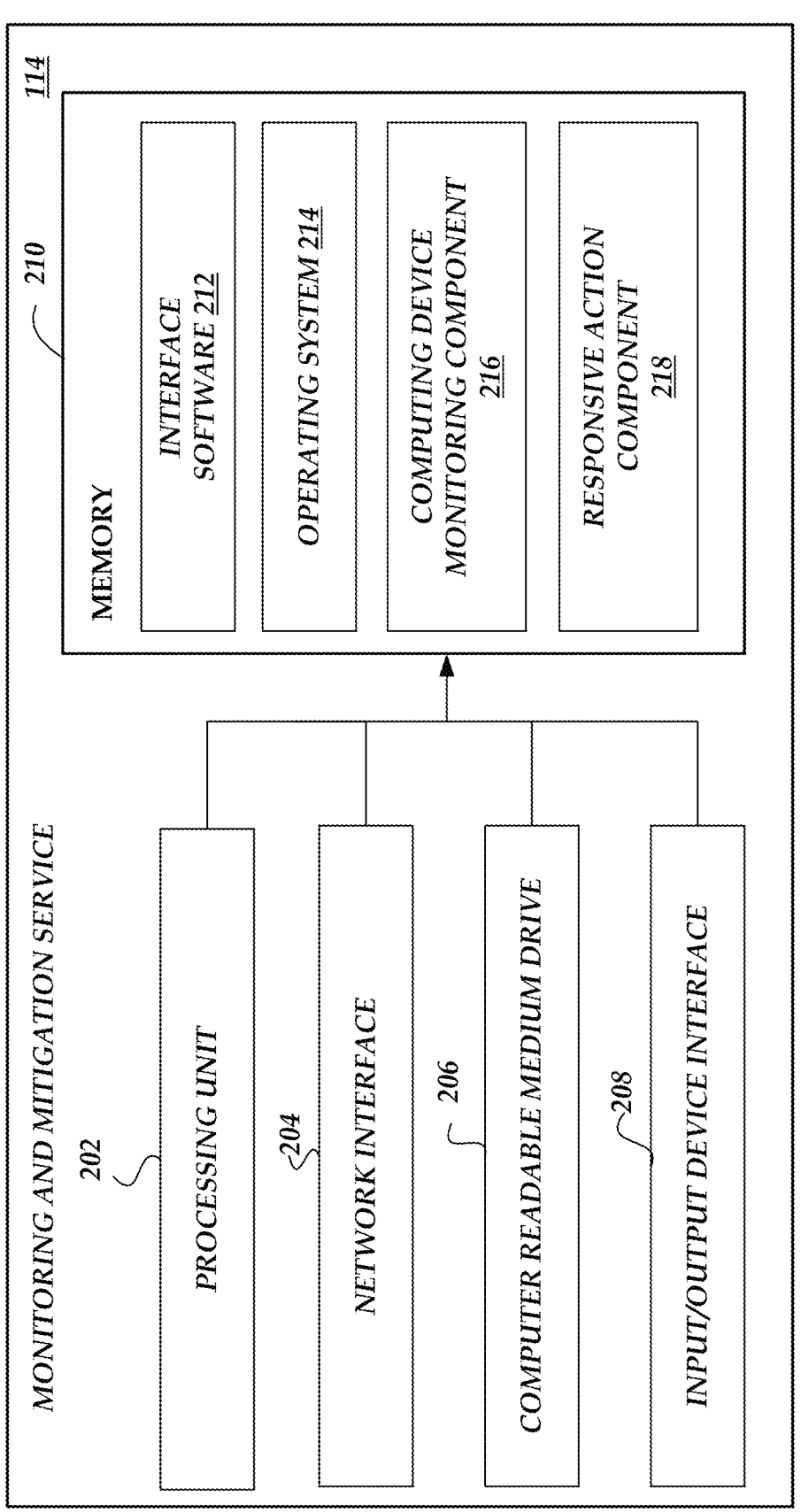
FIG. 2 is a block diagram illustrative of components of a monitoring and mitigation service in accordance with aspects of the present application.

The network service 110 further includes a monitoring and mitigation service 114 that represent the various functionality to monitoring the utilization of network-based resources, such as one or more of the network-based services 112A, 112B and identify or characterize a likelihood that the one or more attributes of network resource utilization is indicative of an enumeration of network-based resources For purposes of the present application, reference to computing device 104 and enumeration computing device 104 should be considered synonymous as appropriate. The monitoring and mitigation service 114 can also identify responsive action in the form network mitigation information that will be utilized to mitigate communications between the identified/characterized enumeration computing device 104 and the network-based services 112. Still further, the monitoring and mitigation service 114 can also identify responsive action in the form of network monitoring or monitoring techniques that may be utilized to collect additional information regarding the identified/characterized enumeration computing device 104 and the network-based services 112. Illustrative components of the monitoring and mitigation service 114 is depicted in FIG. 2. The monitoring and mitigation service 114 is associated with a historical data store 116 related to characterization of enumeration activity and a network mitigation data store 117 for maintaining the network mitigation information or network observation information as described herein.

The network service 110 further includes routing components 118A, 118B that correspond to network routing functionality utilized by the network service 110 to facilitate communications between the network services 112 (or other components) and external computing devices, such as enumeration computing device 104. As will be described, one or more routing components 118A, 118B can be provided or updated with the network mitigation techniques by the monitoring and mitigation service 114.

The network service 110 can further be associated with one or more additional services 120. Illustratively, the additional services 120 include stand-alone services or other services that may provide inputs to the monitoring and mitigation service 114 or other implement a portion of the functionality associated with or utilized by the monitoring and mitigation service 114. For example, the additional services 120 may provide at least a portion of the monitoring and characterization of enumeration computing device 104. In another example, the additional services may provide one or more monitoring techniques that are implement as responsive actions. In yet another example, the additional services 120 may implement services for characterizing measures of success for one or more mitigation techniques including the prevention of enumeration activities, impact on additional client devices or services (e.g., benign activities), and the like. The additional services 120 may be hosted as part of network services 110 or may be an independent service hosted separately or a by a third party.

FIG. 2 depicts one embodiment of an architecture of an illustrative server for implementing the monitoring and mitigation service 114 as described. The general architecture of the monitoring and mitigation service 114 depicted in FIG. 2 includes an arrangement of computer hardware and software components that may be used to implement aspects of the present disclosure. As previously discussed, the components of the monitoring and mitigation service 114 may include physical hardware components, one or more virtualized components or a combination thereof. Additionally, the components of the monitoring and mitigation service 114 or the functionality attributed by the interface component service may be implemented in a virtualized environment. Such virtualized environments may be provided by the manufacturer or by a third-party entity, such as a computing service provider that can instantiate software modules that may be persistent or temporary in nature for purposes of implementing the functionality depicted in the illustrative architecture for the monitoring and mitigation service 114.

As illustrated, the monitoring and mitigation service 114 includes a processing unit 202, a network interface 204, a computer readable medium drive 206, and an input/output device interface 208, all of which may communicate with one another by way of a communication bus. The components of the monitoring and mitigation service 114 may be physical hardware components or implemented in a virtualized environment.

The network interface 204 may provide connectivity to one or more networks or computing systems, such as the network 106 of FIG. 1. The processing unit 202 may thus receive information and instructions from other computing systems or services via a network. The processing unit 202 may also communicate to and from memory 210 and further provide output information for an optional display via the input/output device interface 208 In some embodiments, the monitoring and mitigation service 114 may include more (or fewer) components than those shown in FIG. 2.

The memory 210 may include computer program instructions that the processing unit 202 executes in order to implement one or more embodiments. The memory 210 generally includes RAM, ROM, or other persistent or non-transitory memory. The memory 210 may store an operating system 214 that provides computer program instructions for use by the processing unit 202 in the general administration and operation of the monitoring and mitigation service 114. The memory 210 may further include computer program instructions and other information for implementing aspects of the present disclosure. For example, in one embodiment, the memory 210 includes a computing device monitoring component 216 that is configured to monitoring attributes of network resources and characterize or identify a likelihood that the one or more attributes of network resource utilization is indicative of an enumeration of network-based resources. The memory 210 further includes a responsive action component 218 that is configured to identify and implement network mitigation techniques, network monitoring techniques, or a combination thereof as described herein. The responsive action component 218 is not intended to be limited as to any particular responsive action.

Figure 3A:
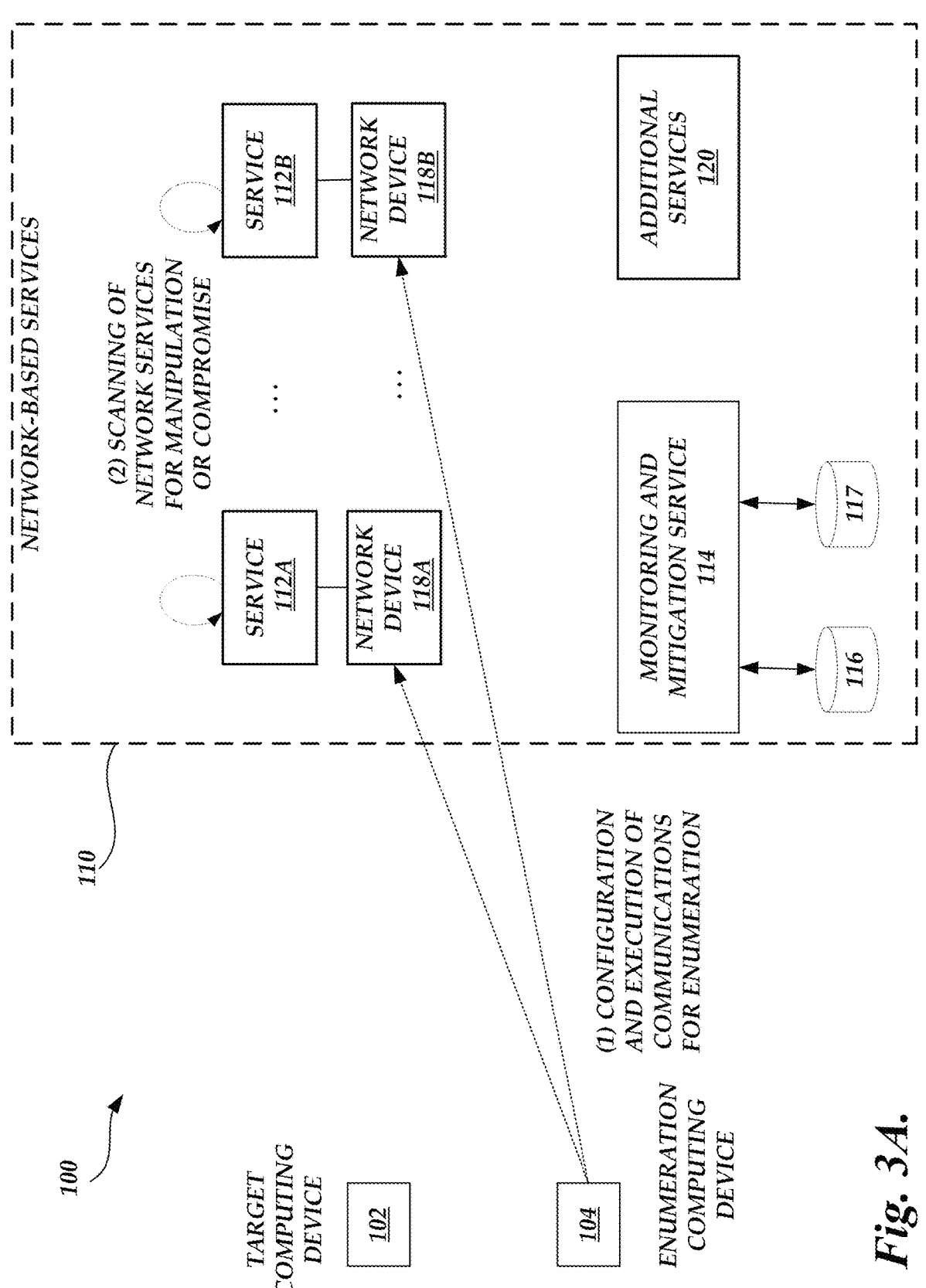
FIGS. 3A-3C are block diagrams of the system of FIG. 1 illustrating various interactions of the components related to for monitoring network based services and implementing responsive actions in accordance with aspects of the present application.
Figure 3B:
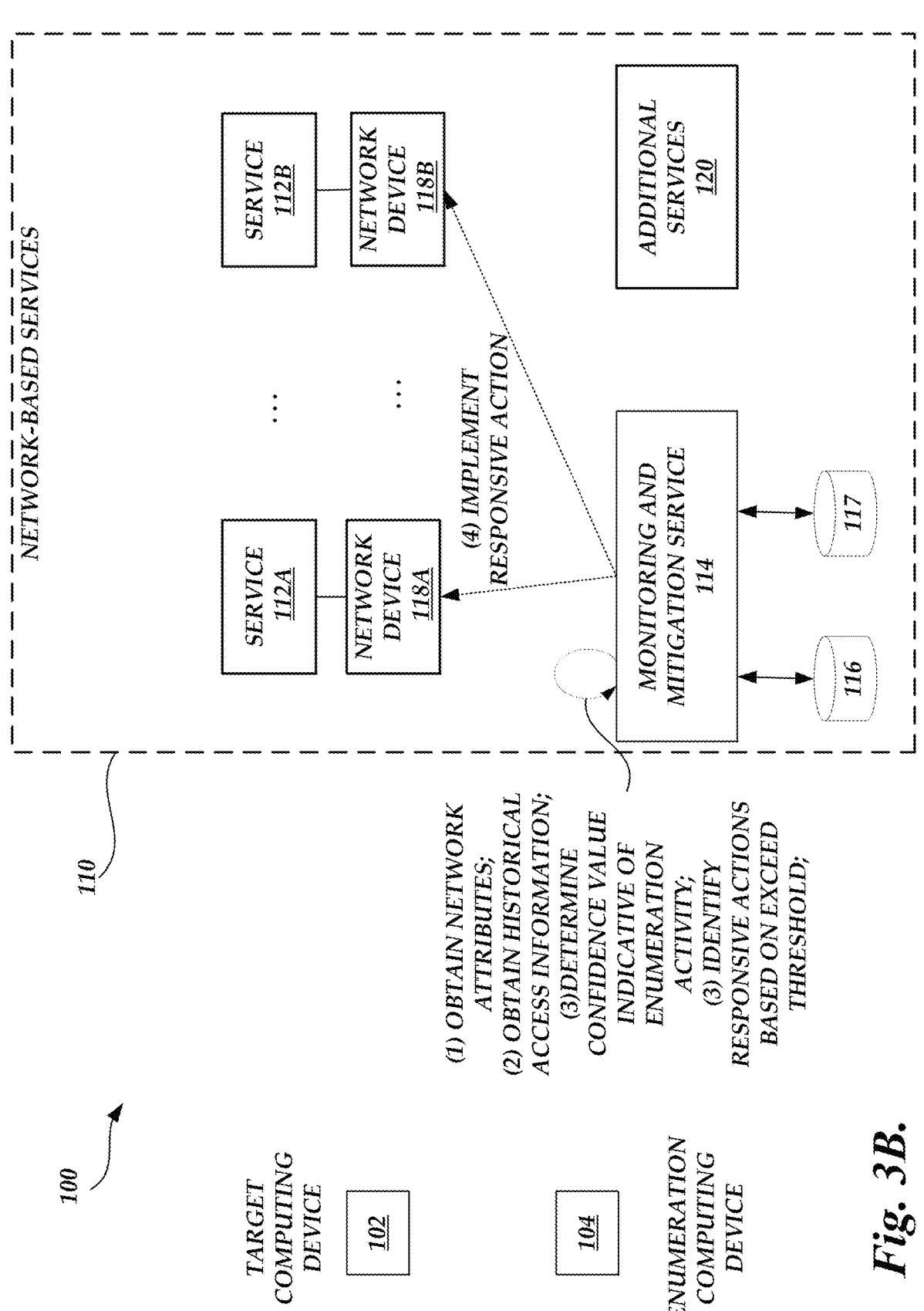
Figure 3C:
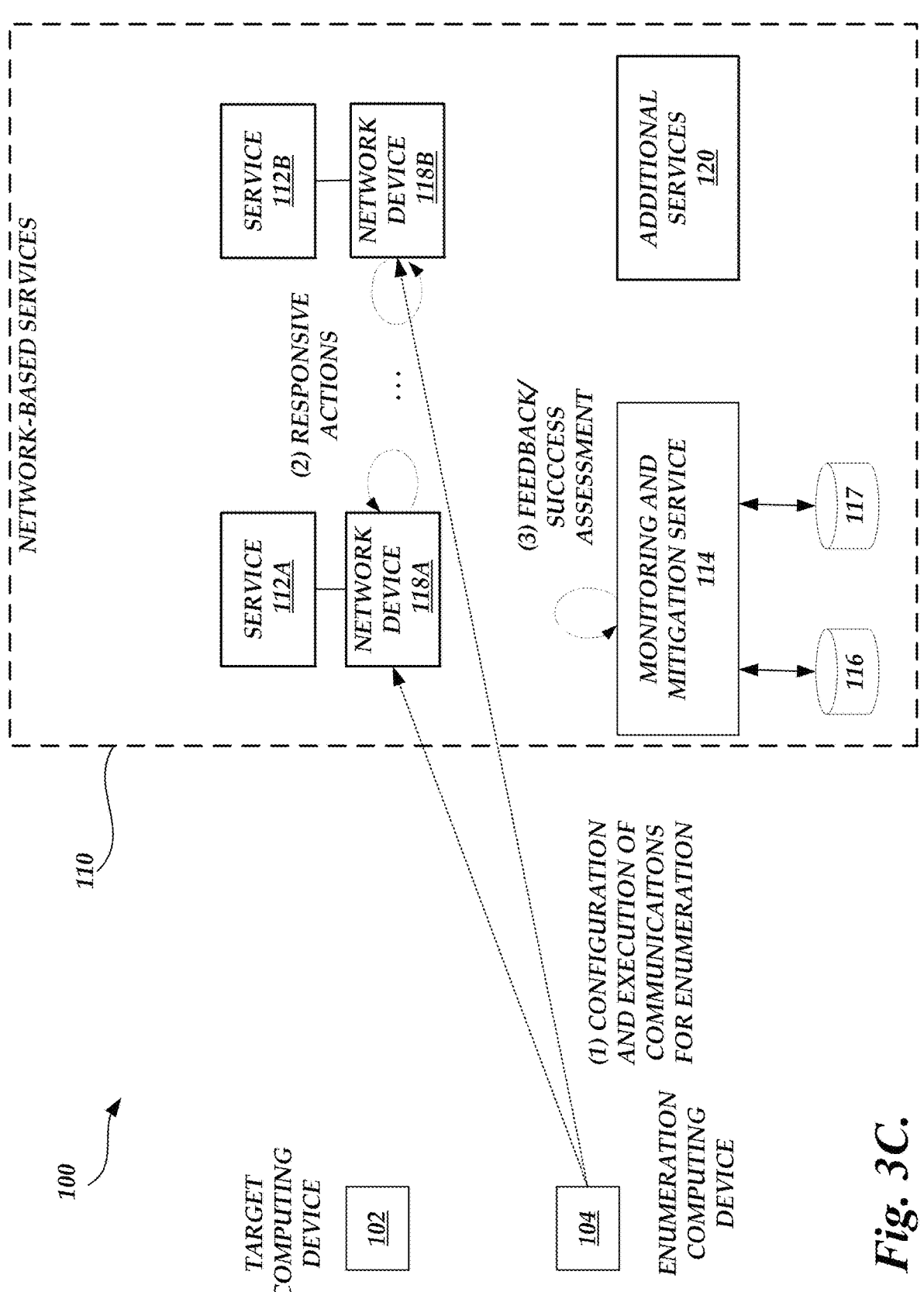

Turning now to FIGS. 3A-3C, illustrative interactions of the components of the system 100 will be described. For purposes of the illustration, it can be assumed that a network service 110 has been configured in a manner to implement a plurality of network services 112 on behalf of customers. The present application is not intended to be limited to any particular type of services or that the number of individual services that may be accessed or generate processing results as part of an execution of an application on behalf of customers. Additionally, for purposes of the present application, computing device 104 will be considered a enumeration computing device 104 that is being utilized a third party (e.g., an entity or software code) to cause communicate/scan network-based resources to enumerate the network-based resources. For example, the results of the enumeration can allow the enumeration computing device 104 to cause an attack on computing device 102 (or a network associated with computing device 102). Such network-based resources can be considered to compromised or manipulated when utilized in such a manner.

With reference to FIG. 3A, an illustrative interaction prior to the implementation of network mitigation techniques will be described. The present application does not require that an attack, such as a coordinated DDOS attack, must occur prior to implementation of the network mitigation techniques described herein. In some embodiments, rather, aspects of the present application are intended to identify or characterize the likelihood that the one or more attributes of network resource utilization is indicative of an enumeration of network-based resources to mitigate characterized enumeration prior to manipulation/compromise of the network-based resources.

At (1), an enumeration computing device 104 configures communications with network-based services 110 for purposes of enumeration. Illustratively, the configuration of the services includes the generation of commands or configuration that causes the instantiation or communications of one or more network services 112A, 112B for purposes of identifying opportunities for accessing, compromising or manipulating such network services, e.g., enumeration. Illustratively, the configuration of the services 112A, 112B can also include one or more previously instantiated services. One skilled in the relevant art will appreciate that a computing device/individual may utilize various techniques to be able to manipulate the network resources 112A, 112A, including various fraudulent or prohibited actions.

At (2), the network service 110 obtains the configuration and commands transmitted by the enumeration computing device 104. Responsive to typical customer interaction, the network service 110 causes the implementation of the configuration or execution of the code such that the network services 112A, 112B could be manipulated for purposes of the participating in a coordinated attack. Although not illustrated, the network services 112A, 112B can then carry out the coordinated attack against a target computing device or network, illustratively represented at 102. As described above, the targets (e.g., computing devices) of the coordinated attacks may be subject to significant disruption or limitation of operational status, which may be independent of the network service provider. Additionally, the manipulation of computing resources (e.g., services 112A, 112B) for purposes of generating large scale network attacks, such as DDOS attacks, especially in multi-tenant network resources can present significant inefficiencies for the network service provider, including limiting functionality of network resources, consuming network bandwidth and disrupting operations or functionality provided by the network service 110. Illustratively, the network mitigation techniques may avoid a successful enumeration of the network services. Additionally, or alternatively, the network monitoring techniques can be used to validate enumeration techniques or provide evidence/examples of further enumeration attempts.

With reference to FIG. 3B, at (1) the monitoring and mitigation service 114 can obtain network attributes or metrics associated with the configurations or commands generated by the enumeration computing device 104 or the resulting effect on the manipulated network services 112A, 112B. For example, the monitoring and mitigation service 114 can observe network traffic information, such as byte count information, transfer control protocol ("TCP") data/information, network address information (e.g., IP address information), and the like. At (2), the monitoring and mitigation service 114 can further obtain historical information related to network attributes or metrics that have been determined to be indicative of enumeration activity. Illustratively, the monitoring and mitigation service 114 can be configured to utilize historical information to mitigate or avoid characterization of acceptable or desirable activities as enumeration activity.

Based on the identified attributes, the monitoring and mitigation service 114 can identify or characterize the likelihood that the one or more attributes of network resource utilization is indicative of an enumeration of network-based resources at (3). Illustratively, the identification or characterization of the command and control node can be based on a variety of information, including machine learning techniques, historical information, automated processes, manual processing and the like. Illustratively, the identification or characterization of likelihood that the one or more attributes of network resource utilization is indicative of an enumeration of network-based resources can be expressed as confidence values. The confidence values can be in the form of the likelihood that communications, requests or configurations will correspond to legitimate or desirable. The confidence values can be in the form of the likelihood that communications, requests or configurations will correspond to undesirable or unauthenticated.

Illustratively, the monitoring and mitigation service 114 can implement a process/routine that utilizes a prescribed time window for monitoring attributes to determine confidence values. Illustratively, the monitoring and mitigation service 114 can begin with a default or standard confidence value, such as a confidence value that corresponds to an indication of a likely enumeration activity. The monitoring and mitigation service 114 can then determine whether the computing device has been authorized within the prescribed time window. Authorization information can be indicative that the network attribute activity does not correspond to enumeration activity. Accordingly, the monitoring and mitigation service 114 can modify or adjust the default value. In one embodiment, the adjustment can be a lowering of a default value that is set at a higher level. In another embodiment, the adjustment be a raising of a default value if no authentication has been detected/determined to raise a lower default value.

At (3), the monitoring and mitigation service 114 identifies network mitigation techniques for the identified enumeration computing device 104 and the monitored network attributes. As described above, the monitoring and mitigation service can identify network mitigation information of various forms that will cause network communications received from the identified enumeration computing device 104 to be terminated or otherwise not delivered to the intended network-based resources. More specifically, in one embodiment, the network mitigation techniques includes techniques to disrupt network communications received from the target/identified computing device. For example, the network mitigation technique can include throttling communications to limit the number of communications between the enumeration computing device 104 and the network service 110. In another example, the network mitigation technique can include the generation of non-responsive communications such as the transmission of incorrect response to communications or the selection of random responsive communication. Such non-responsive communication can cause the enumeration computing device 104 to interpret the non-responsive communication as a failed enumeration technique or a failed attempt at manipulation. In still another example, the network mitigation technique can include the suppression of communication that would otherwise be expected by the enumeration computing device 104. For example, the mitigation technique can cause the prevent of the transmission of acknowledgements, retransmissions, etc. One skilled in the relevant art will appreciate that other network mitigation techniques may be applied and that the disclosed network mitigation techniques are only illustrative in nature.

In some embodiments, the network mitigation techniques can be associated with expiration criteria for the routing components that receive and implement the network mitigation technique. The expiration criteria can correspond to time-based criteria or event-based criteria. After the expiration of the network mitigation techniques, the monitoring and mitigation service 114 can renew the network mitigation techniques and cause the withdrawal of the network mitigation information.

At (4), the monitoring and mitigation service can propagate the network mitigation information, such as the null routing address, to routing components within the network service provider network. The routing components will then be updated with the network mitigation information to implement the network mitigation technique. The receiving routers can propagate the network mitigation information such that network mitigation information can be implemented across multiple regions. In other embodiments, the monitoring and mitigation service 114 can select network devices 118 by specific region so that only a partial distribution of the network mitigation information is provided. The monitoring and mitigation service 114 can further implement additional logic that will keep the network mitigation information from being further updated or overwritten for a period of time.

Turning now to FIG. 3C, after the implementation of the network migration, assume at (1) that the enumeration computing device 104 attempts to further provide configuration or commands to generate or perpetuate enumeration activity. As illustrated in FIG. 3C, the network devices 118A, 118B implement network mitigation such that communications to between the services 112A, 112B and the enumeration computing device 104 are no longer possible. As described above, in some embodiments, the network mitigation information can be associated with expiration criteria for the routing components that receive and implement the network mitigation technique. After the expiration of the network mitigation information, the monitoring and mitigation service 114 can renew the network mitigation information and cause the withdrawal of the network mitigation information.

In some embodiments, the monitoring and mitigation services can obtain information that characterizes a measure of success of any mitigation techniques that have been implemented illustrated at (3). For example, the measure of success can correspond to an assessment of whether enumeration activity was terminated, reduced or otherwise mitigated. In another example, the measure of success can correspond to an assessment of an impact on client computing devices that are not otherwise characterized as engaging in enumeration activity and whether mitigation techniques impact otherwise benign activities. The assessment can be expressed as an effectiveness, which can be illustratively utilized in future selections of the mitigation technique.

Figure 4:
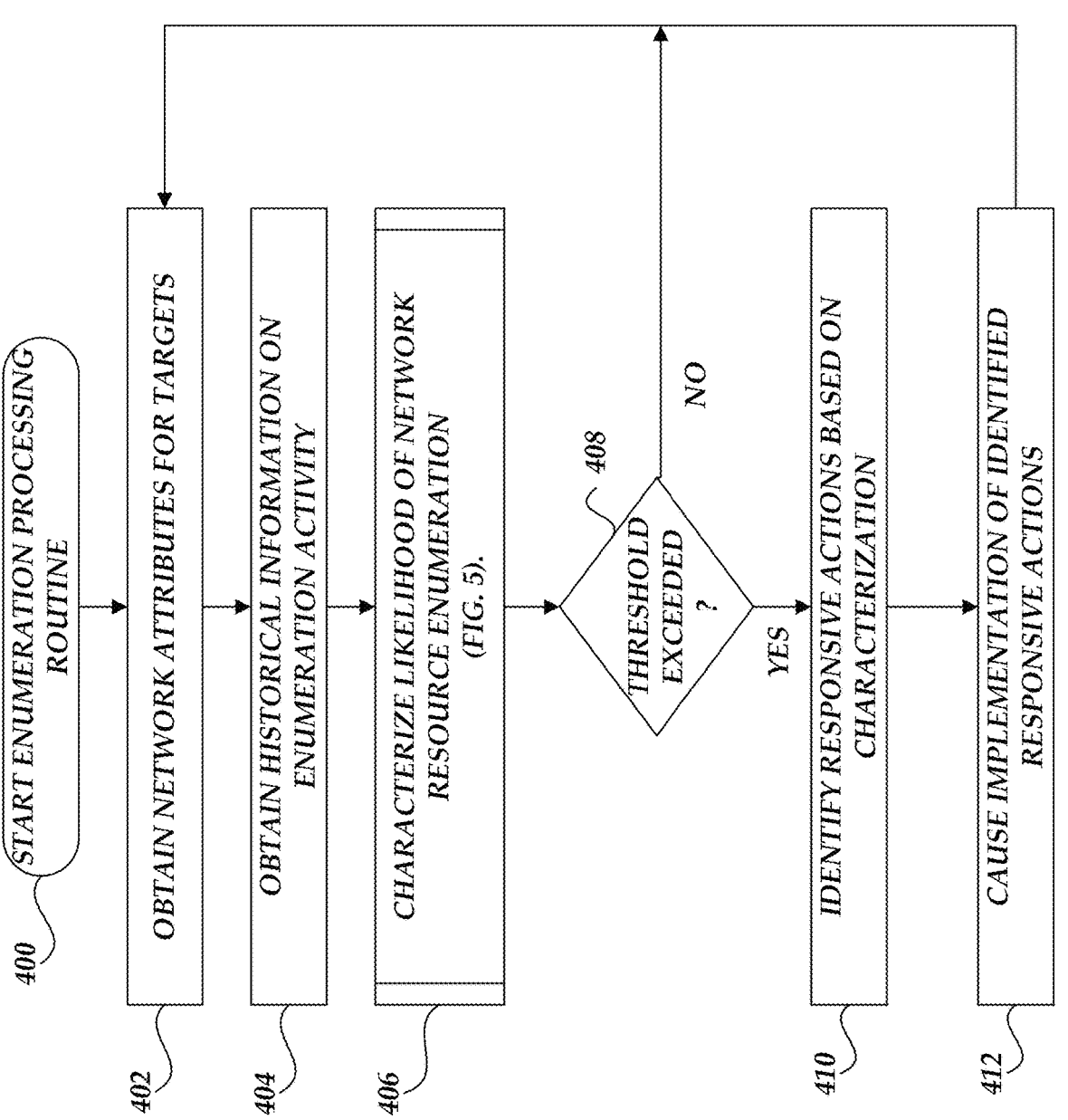
FIG. 4 is a flow diagram depicting an example routine for enumeration monitoring in accordance with aspects of the present application.

Turning now to FIG. 4, a routine 400 for network management utilizing network mitigation information will be described. Routine 400 is illustratively implemented by the monitoring and mitigation service 114. At block 402, the monitoring and mitigation service 114 can obtain network attributes or metrics associated with the configurations or commands generated by the enumeration computing device 104 (as characterized or identified) or the resulting effect on the manipulated network services 112A, 112B.

At block 402, the monitoring and mitigation service 114 can obtain network attributes or metrics associated with the configurations or commands generated by the enumeration computing device 104 or the resulting effect on the manipulated network services 112A, 112B. For example, the monitoring and mitigation service 114 can observe network traffic information, such as byte count information, transfer control protocol ("TCP") data/information, network address information (e.g., IP address information), and the like. At block 404, the monitoring and mitigation service 114 can further obtain historical information related to network attributes or metrics that have been determined to be indicative of enumeration activity. Illustratively, the monitoring and mitigation service 114 can be configured to utilize historical information to mitigate or avoid characterization of acceptable or desirable activities as enumeration activity.

Based on the identified attributes, at block 406, the monitoring and mitigation service 114 can identify or characterize the likelihood that the one or more attributes of network resource utilization is indicative of an enumeration of network-based resources. Illustratively, the identification or characterization of the command and control node can be based on a variety of information, including machine learning techniques, historical information, automated processes, manual processing and the like. Illustratively, the identification or characterization of likelihood that the one or more attributes of network resource utilization is indicative of an enumeration of network-based resources can be expressed as confidence values. The confidence values can be in the form of the likelihood that communications, requests or configurations will correspond to legitimate or desirable. The confidence values can be in the form of the likelihood that communications, requests or configurations will correspond to undesirable or unauthenticated. An illustrative sub-routine 500 (FIG. 5) will be described for implementing block 406.

At decision block 408, a test is conducted to determine whether the calculated or determine confidence value exceeds a threshold Illustratively, if the calculated or determined confidence value exceeds a threshold, the confidence value can be considered to indicate a likelihood that the one or more attributes of network resource utilization is indicative of an enumeration of network-based resources. If no threshold is exceeded, the routine 400 can continue to monitor and no mitigation techniques will be applied on the basis the calculated confidence value.

Alternatively, if the determined confidence value exceeds the threshold, at block 410, the monitoring and mitigation service 114 identifies responsive actions for the identified enumeration computing device 104 and the monitored network attributes. As described above, the monitoring and mitigation service can identify network mitigation information of various forms that will cause network communications received from the identified enumeration computing device 104 to be terminated or otherwise not delivered to the intended network-based resources. More specifically, in one embodiment, the network mitigation techniques includes techniques to disrupt network communications received from the target/identified computing device. For example, the network mitigation technique can include throttling communications to limit the number of communications between the enumeration computing device 104 and the network service 110. In another example, the network mitigation technique can include the generation of non-responsive communications such as the transmission of incorrect response to communications or the selection of random responsive communication. Such non-responsive communication can cause the enumeration computing device 104 to interpret the non-responsive communication as a failed enumeration technique or a failed attempt at manipulation. In still another example, the network mitigation technique can include the suppression of communication that would otherwise be expected by the enumeration computing device 104. For example, the mitigation technique can cause the prevent of the transmission of acknowledgements, retransmissions, etc. One skilled in the relevant art will appreciate that other network mitigation techniques may be applied and that the disclosed network mitigation techniques are only illustrative in nature. Illustratively, as described previously, in some embodiments, the monitoring and mitigation services can utilized previously collected information that characterizes a measure of success of any mitigation techniques that have been implemented. The assessment can be expressed as an effectiveness, which can be illustratively utilized in future selections of the mitigation technique.

In still other embodiments, the responsive action can correspond to a selectin of network monitoring or monitoring techniques. The network monitoring techniques can be used to validate enumeration techniques or provide evidence/examples of further enumeration attempts.

In some embodiments, the network mitigation techniques can be associated with expiration criteria for the routing components that receive and implement the network mitigation technique. The expiration criteria can correspond to time-based criteria or event-based criteria. After the expiration of the network mitigation techniques, the monitoring and mitigation service 114 can renew the network mitigation techniques and cause the withdrawal of the network mitigation information.

At block 412, the monitoring and mitigation service can propagate the network mitigation information, such as the null routing address, to routing components within the network service provider network. The routing components will then be updated with the network mitigation information to implement the network mitigation technique. The receiving routers can propagate the network mitigation information such that network mitigation information can be implemented across multiple regions. In other embodiments, the monitoring and mitigation service 114 can select network devices 118 by specific region so that only a partial distribution of the network mitigation information is provided. The monitoring and mitigation service 114 can further implement additional logic that will keep the network mitigation information from being further updated or overwritten for a period of time. The routine 400 returns for continued analysis. In some embodiments, the monitoring and mitigation services can obtain information that characterizes a measure of success of any mitigation techniques that have been implemented. For example, the measure of success can correspond to an assessment of whether enumeration activity was terminated, reduced or otherwise mitigated. In another example, the measure of success can correspond to an assessment of an impact on client computing devices that are not otherwise characterized as engaging in enumeration activity and whether mitigation techniques impact otherwise benign activities. The assessment can be expressed as an effectiveness, which can be illustratively utilized in future selections of the mitigation technique.

Figure 5:
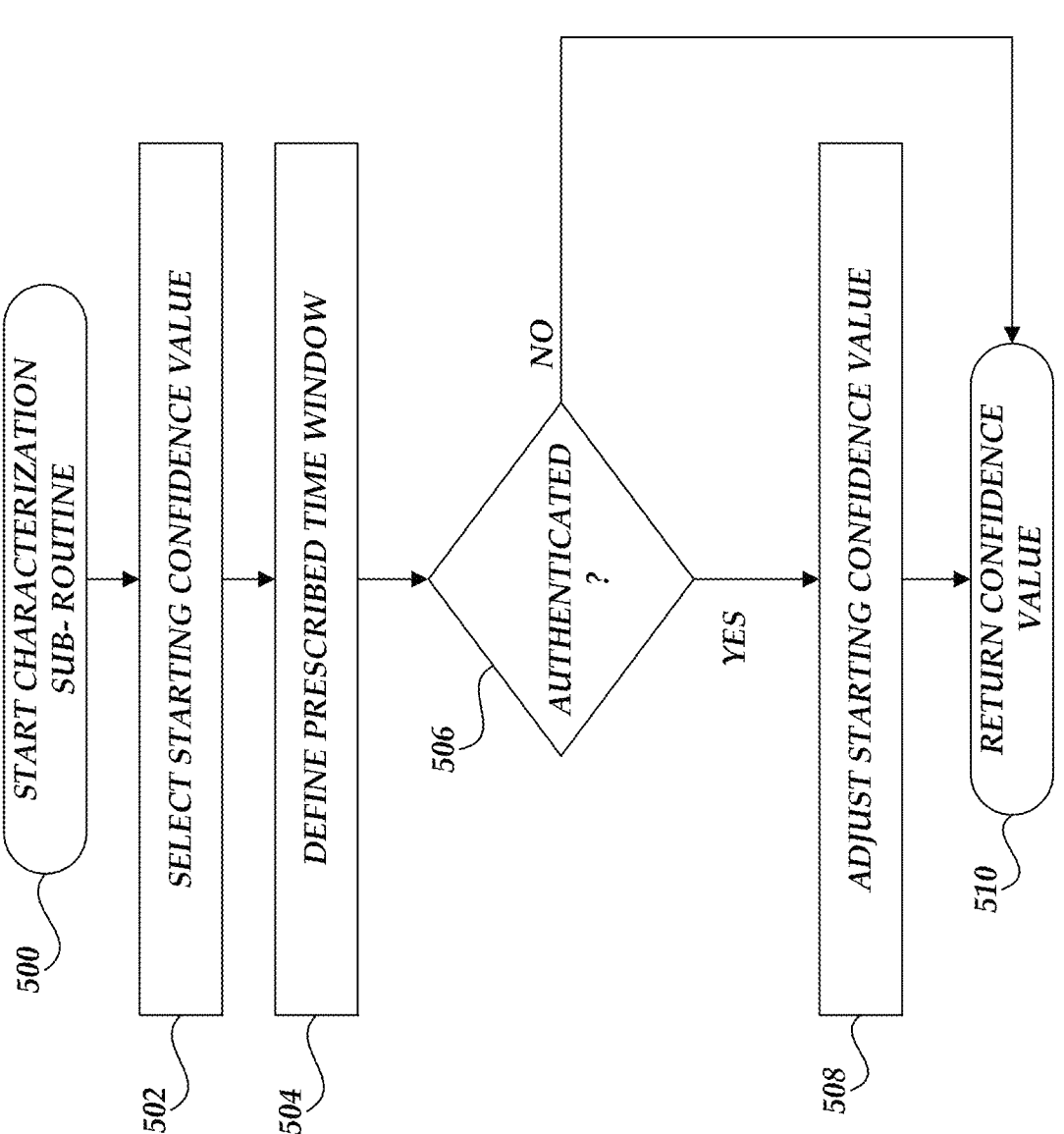
FIG. 5 is a flow diagram depicting an example sub-routine for determination of confidence values related to characterizations of enumeration activity in accordance with aspects of the present application.

Turning now to FIG. 5, a sub-routine 500 for generating a characterization of the likelihood that the one or more attributes of network resource utilization is indicative of an enumeration of network-based resources will be described. Illustratively, the monitoring and mitigation service 114 can implement a process/routine that utilizes a prescribed time window for monitoring attributes to determine confidence values.

At block 502, the monitoring and mitigation service 114 can begin with a default or standard confidence value, such as a confidence value that corresponds to an indication of a likely enumeration activity. At block 504, the monitoring and mitigation service 114 defines the prescribed time window for monitoring network attributes. At decision block 506, the monitoring and mitigation service 114 can then determine whether the computing device has been authorized within the prescribed time window. Authorization information can be indicative that the network attribute activity does not correspond to enumeration activity. If so, at block 508, the monitoring and mitigation service 114 can modify or adjust the default value. In one embodiment, the adjustment can be a lowering of a default value that is set at a higher level. In another embodiment, the adjustment be a raising of a default value if no authentication has been detected/determined to raise a lower default value. Alternatively, the sub-routine 500 proceeds to block 510. At block 510, sub-routine terminates.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system for managing network-based services, the system comprising:

one or more computing devices associated with a processor and a memory for executing computer-executable instructions to implement a monitoring and mitigation service, wherein the monitoring and mitigation service is configured to:

obtain one or more attributes of network resource utilization corresponding to communications with network-based resources by a computing device;

monitor the one or more attributes of the network resource utilization of the computing device as indicative of enumeration activity;

characterize a likelihood of enumeration activity, wherein characterizing the likelihood of enumeration activity includes:

determining whether the computing device has been authorized within a prescribed time window to access the network-based resources; and assigning a confidence value that quantitatively expresses a likelihood that the computing device performed an enumeration on the network-based resources based on an input of a determination of whether the computing device has been authorized within the prescribed time window to access the network-based resources and the monitored one or more attributes of the network resource utilization of the computing device, wherein the enumeration identifies potential vulnerabilities for a distributed denial of service attack on the network-based resources;

identify network mitigation techniques responsive to the confidence value exceeding a threshold, wherein the network mitigation techniques are dependent on historical analysis of enumeration of the network-based resources; and cause an implementation of the network mitigation techniques in one or more routing components associated with the network-based resources such that the communications with the network-based resources by the computing device are mitigated.

2. The system as recited in claim 1, wherein the prescribed time window corresponds to a twenty-four hour time window.

3. The system as recited in claim 1, wherein the network resource utilization corresponding to the communications with the network-based resources by the computing device corresponds to one or more attributes of network access communications.

4. The system as recited in claim 1, wherein the network mitigation techniques correspond to a throttling of network communications.

5. The system as recited in claim 1, wherein the network mitigation techniques correspond to suppression of acknowledge messages.

6. The system as recited in claim 1, wherein the network mitigation techniques correspond to a selection of a non-responsive communication.

7. The system as recited in claim 1, wherein the determination of whether the computing device has been authorized within the prescribed time window includes detecting an authentication of the computing device.

8. A method for managing for network-based services comprising:

obtaining one or more attributes of network resource utilization corresponding to communications with network-based resources;

monitoring the one or more attributes of network resource utilization of a computing device indicative of enumeration activity;

characterizing a likelihood of enumeration activity, wherein characterizing the likelihood of enumeration activity includes:

determining whether the computing device has been authorized within a prescribed time window to access the network-based resources; and assigning a confidence value that quantitatively expresses a likelihood that the computing device performed an enumeration on the network-based resources based on an input of whether the computing device has been authorized within the prescribed time window to access the network-based resources and the monitored one or more attributes of the network resource utilization of the computing device, wherein the enumeration identifies potential vulnerabilities for a distributed denial of service attack on the network-based resources;

identifying one or more responsive actions, the one or more responsive actions corresponding to the confidence value; and causing an implementation of the one or more responsive actions in one or more routing components associated with the network-based resources.

9. The method as recited in claim 8, wherein identifying the one or more responsive actions includes identifying the one or more responsive actions when the confidence value exceeds a threshold.

10. The method as recited in claim 9, wherein the threshold is a dynamic threshold.

11. The method as recited in claim 10, wherein the prescribed time window corresponds to a twenty-four hour time window.

12. The method as recited in claim 8, wherein monitoring the one or more attributes of the network resource utilization includes monitoring network traffic for a period of time to identify attributes of at least one of a shared network address or a dedicated network address.

13. The method as recited in claim 8, wherein the network resource utilization corresponding to communications with the network-based resources by the computing device corresponds to one or more attributes of network access communications.

14. The method as recited in claim 8, wherein the one or more responsive actions corresponds to at least one network mitigation technique, wherein the at least one network mitigation technique causes a mitigation of network communications between the computing device and the network-based resources.

15. The method as recited in claim 14, wherein the at least one network mitigation technique corresponds to a throttling of the network communications.

16. The method as recited in claim 14, wherein the at least one network mitigation technique corresponds to suppression of acknowledge messages.

17. The method as recited in claim 14, wherein the at least one network mitigation technique corresponds to a selection of a non-responsive communication.

18. The method as recited in claim 8, wherein the one or more responsive actions corresponds to at least one network monitoring technique, wherein the at least one network monitoring technique causes a capture of network communications between the computing device and the network-based resources.

19. The method as recited in claim 8, wherein the input of whether the computing device has been authorized within the prescribed time window includes detecting an authentication of the computing device.

20. A non-transitory computer-readable storage medium storing computer executable instructions that when executed by one or more computer hardware processors perform operations comprising:

obtaining one or more attributes of network resource utilization corresponding to communications with network-based resources;

monitoring the one or more attributes of network resource utilization of a computing device indicative of enumeration activity;

characterizing a likelihood of enumeration activity, wherein characterizing the likelihood of enumeration activity includes:

determining whether the computing device has been authorized within a prescribed time window to access the network-based resources; and assigning a confidence value that quantitatively expresses a likelihood that the computing device performed an enumeration on the network-based resources based on an input of whether the computing device has been authorized within the prescribed time window to access the network-based resources and the monitored one or more attributes of the network resource utilization of the computing device, wherein the enumeration identifies potential vulnerabilities for a distributed denial of service attack on the network-based resources;

identifying one or more responsive actions, the one or more responsive actions corresponding to the confidence value; and causing an implementation of the one or more responsive actions in one or more routing components associated with the network-based resources.

21. The non-transitory computer-readable storage medium of claim 20, wherein the prescribed time window corresponds to a twenty-four hour time window.

22. The non-transitory computer-readable storage medium of claim 20, wherein the input of whether the computing device has been authorized within the prescribed time window includes detecting an authentication of the computing device.

\* \* \* \* \*